United States Patent [19]

Hollins et al.

[11] Patent Number: 4,759,026
[45] Date of Patent: Jul. 19, 1988

[54] DYE LASERS

[75] Inventors: Richard C. Hollins; David L. Jordan, both of Worcester, England

[73] Assignee: The Secretary of State for Defence in Her Britannic Majesty's Government of the United Kingdom of Great Britain and Northern Ireland, London, England

[21] Appl. No.: 895,940

[22] Filed: Aug. 13, 1986

[30] Foreign Application Priority Data

Aug. 13, 1985 [GB] United Kingdom ............... 8520311

[51] Int. Cl.$^4$ .................. H01S 3/111; H01S 3/20
[52] U.S. Cl. ........................ 372/53; 372/11; 372/23; 372/54
[58] Field of Search ............ 372/54, 53, 23, 11, 372/9, 69

[56] References Cited

U.S. PATENT DOCUMENTS 3,810,040  5/1974  Martin et al. ............... 372/23
4,710,937 12/1987  Oomori et al. ............. 372/53

Primary Examiner—James W. Davie
Assistant Examiner—Xuan T. Vo
Attorney, Agent, or Firm—William R. Hinds

[57] ABSTRACT

A dye laser capable of lasing at a plurality of wavelengths simultaneously, e.g. three, comprises a corresponding plurality of transparent containers 4, 5, 6 located between a partially-reflecting mirror 1 and a tiltably adjustable retroreflecting diffraction grating 2 with the containers transversely staggered. The staggered ends of the containers are irradiated by a shallow beam 9 from a pumping laser 7 and contain separate dye solutions whereof the emission spectra increase in wavelength from container to container starting from that container nearest the pumping laser. There are thus formed three parallel cavities which can lase simultaneously, tuned by the grating 2 operating in three different diffraction orders.

19 Claims, 1 Drawing Sheet

DYE LASERS

This invention relates to dye lasers, and provides a dye laser capable of providing a tunable output at a plurality of wavelengths widely spaced across the visible waveband. Forms of the invention can provide such a plurality either singly or, as desirable for certain applications, simultaneously.

In a known form of dye laser, eg as described by T W Hänsch in Applied Optics, vol 11, no 4, p 895 (1972) the laser cavity comprises a transparent container holding the dye solution located between a partially-reflecting mirror and a retroreflecting diffraction grating which is tiltable through an angle to tune the laser. The laser is pumped by a further laser which directs a horizontal slit-like UV beam into the vessel from a direction transverse to the line between mirror and grating, thereby exciting a narrow filament of solution parallel to this line immediately adjacent the surface of the container facing the UV beam. The desired wavelength within the band covered by a particular dye is selected by tilting the grating so that it operates at the particular order of diffraction appropriate to that wavelength. (The additional components included by Hänsch are not essential to the basic functioning of his laser).

The above described laser provides a tunable output at a single selected wavelength over the band covered by the particular dye. For some applications, however, it is desirable to provide a tunable signal wavelength over a wider band than that of a single dye, and for others to provide tunable outputs at several wavelengths simultaneously over such wider band.

According to the present invention a dye laser comprises a cavity including container means for containing a plurality of separate dye solutions located between a semi-transparent reflector and a retroreflective diffracting means;

said container means having a compartment for each dye solution and said compartments having transparent portions extending transversely relative to a line between said reflector and said diffracting means, said portions being staggered in said transverse direction;

and pumping laser means arranged to simultaneously irradiate all said portions with a shallow beam directed in a transverse direction;

whereby when said compartments contain separate dye solutions whereof the emission spectra increase in wavelength from compartment to compartment starting from that compartment whose said transparent portion is nearest the pumping laser, each said portion intercepted by the beam can provide dye-laser action corresponding to its contained dye solution without absorption of its emitted spectrum by a solution whose emission spectrum is of longer wavelength.

The compartments may be individual separable containers arranged in side-by-side overlapping relationship, may have said transparent portions of rectangular cross-section, and may be inclined in the direction of said line between said reflector and said diffracting means to suppress unwanted radiation reflected from their walls.

The diffracting means may be one adapted to give retroreflection simultaneously at the same incidence angle in a plurality of diffraction orders whereby to produce simultaneous dye-laser action in all said compartments when containing appropriate dye solutions; it may be an adjustably tilted grating.

The pumping laser may be any sufficiently powerful laser which generates a wavelength sufficiently shorter than the the shortest dye-laser wavelength to be generated, and may be an excimer laser.

BRIEF DESCRIPTION OF THE DRAWINGS

To enable the nature of the present invension to be more readily understood, attention is directed, by way of example, to the accompanying drawings wherein:

FIGS. 1 and 2 show a dye laser providing three tunable outputs simultaneously in three widely separated bands. In these Figures a fixed partially-reflecting mirror 1 is located opposite a retroreflecting (Littrow) diffraction grating 2 which is adjustably tilted about an axis 3. Between the mirror 1 and the grating 2 are located three silica cuvettes 4, 5 and 6 of rectangular cross-section suitably 5 mm × 20 mm × 40 mm high. The cuvettes are arranged side-by-side with their long (20 mm) sides in contact and are inclined at an angle of about 45° to a line joining mirror 1 to grating 2. The cuvetes are staggered about 1–2 mm in a direction transverse to that line, so that the short (5 mm) wall of cuvette 4 lies beyond that of cuvette 5, which in turn lies beyond that of cuvette 6. All the wall faces are polished inside and out.

Figure 1:
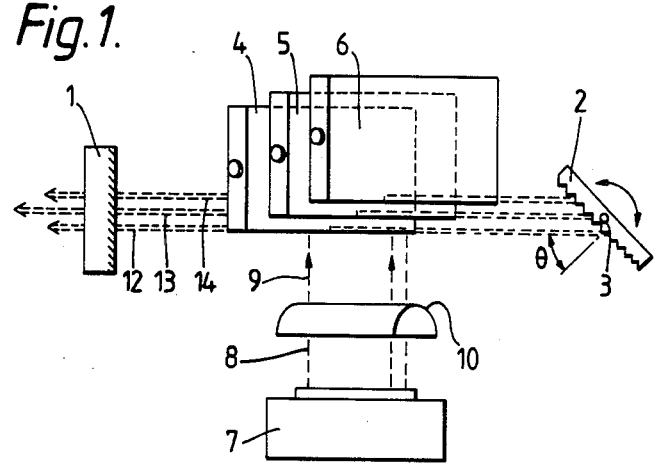
FIG. 1 is a schematic plan view of a dye laser embodying the present invention.
Figure 2:
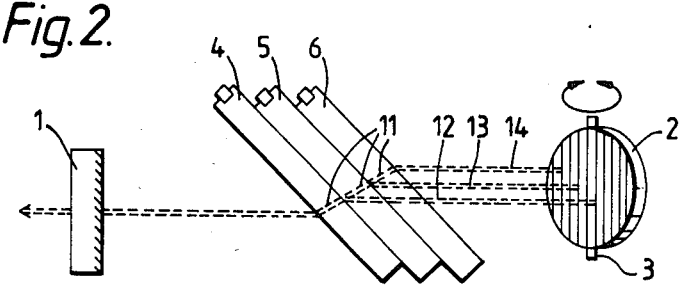
FIG. 2 is an elevation of the laser of FIG. 1 with the pumping laser and lens omitted for clarity.

A XeCl pumping laser 7 produces a strip beam 8 which is focussed down to a shallow beam 9 by a cylindrical lens 10. The beam 9 is inclined about its axis to irradiate simultaneously the 5 mm walls of the three cuvettes as shown at 11. Cuvette 4 is filled with (in the described example) a deep blue dye (BiBuQ dissolved in cyclohexane), cuvette 5 with a blue/green dye (Coumarin 102 dissolved in methanol) and cuvette 6 with a yellow-red dye (Rhodamine 6G dissolved in methanol). The dye concentrations are adjusted so that the penetration depth of beam 9 into the solutions is similar to its height, eg about 1mm; suitable concentrations are about $10^{-3}$ mole/liter. Thus a narrow filament of intensely excited dye, about 1 mm square in cross-section and 5 mm long, is produced in each cuvette. Each filament thus forms part of a tunable laser cavity whose axis lies along the length of the filament and produces one of the external light beams 12, 13, 14 by laser action. The inclination of beam 9 about its axis is made such that allowing for refraction at the walls, these external beams are correctly aligned as shown. The reason for inclining the cuvettes at 45° is to assist control of the resulting dye laser by optical elements external to the cuvettes; the walls terminating the gain filaments thereby do not lie normal to the gain filaments, and hence unwanted amplification of radiation reflected from these walls is suppressed.

The staggered arrangement of the cuvettes, and hence of the gain filaments, allows simultaneous lasing by all three dyes. This is because each dye absorbs strongly light having wavelengths immediately shorter than those of its own emission, and hence if they were not staggered, lasing by green and blue dyes, for example, would be impeded by absorption in a red dye. With the staggered arrangement described, emission from each of the dyes need only pass through a dye or dyes which emit at shorter wavelengths than the emitting dye. Thus in the present example red/yellow light emitted in cuvette 6 can pass safely through the blue/green dye in cuvette 5 and the deep blue in cuvette 4 without absorption, and similarly blue/green light emitted in cuvette 5 can pass safely through the deep blue dye in cuvette 4, whereas deep blue light emitted in cuvette 4 does not have to pass through cuvettes 5 and 6 nor blue/green light from cuvette 5 through cuvette 6.

The above-described arrangement allows the simultaneous production of the three parallel, closely-clustered light beams 12, 13 and 14 in three separate emission bands which can be tuned by a single common diffracting element, viz the grating 2, operating simultaneously in three different orders of diffraction. Grating 2 is a relatively coarse grating (eg groove frequency $1/d = 632$ mm$^{-1}$, where d is the groove spacing) used at incidence angles around $\theta = 45°$, under these conditions the diffraction orders are quite finely-spaced in wavelength and, for a single angle of incidence, retroreflection occurs at three wavelengths within the visible waveband corresponding to a group of diffraction orders such as $n = 4$, 5, and 6. The aforementioned three dyes have emission spectra which can be covered simultaneously by these three successive diffraction orders, so that the wavelengths of emission of all three dyes can be controlled simultaneously by a common incidence angle $\theta$ on grating 2. The three wavelengths are:

4th order: $\lambda = \frac{1}{2}d \sin \theta$ (yellow/red)

5th order: $\lambda = (2/5)d \sin \theta$ (blue/green)

6th order: $\lambda = \frac{1}{3}d \sin \theta$ (deep blue)

The arrangement also enables efficient use of the grating blaze by all three output wavelengths. The grating is blazed at a particular angle which is common to all of the three tuned cavities formed, so the blaze can favour retroreflection of all three wavelengths because of the use of different orders of diffraction. The coarse grating required for this arrangement can be produced with high blazing efficiency so that little power is wasted in unwanted diffraction orders.

Figure 3:
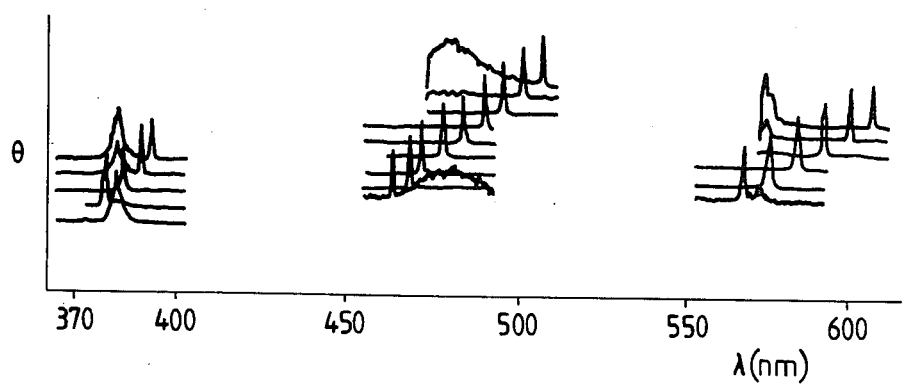
FIG. 3 shows graphs of laser spectra obtained with the laser of FIG. 1.

A series of spectra from the laser recorded at different incidence angles of grating 2 is shown in FIG. 3, in which horizontally-displaced spectra indicate simultaneous outputs from all three dyes and vertically-displaced spectra indicate different values of $\theta$. The laser can be seen to give good coverage of the visible bandwidth. (The output mirror 1 used in the particular laser which produced these spectra was originally designed for a He-Ne laser, and its low reflectivity near 560 nm and below 400 nm limited the tunable range of Rhodamine 6G and BiBuQ to some extent. Improved operation was shown at these wavelengths using other mirrors). The "gaps" in the visible waveband at which the laser does not operate can be covered by such dyes as Coumarin 120 (420-460 nm) and Coumarin 153 (522-600 nm), both of which lase with high efficiency. For operation at high mean powers, the dye solution may need to be circulated and cooled in a known manner.

Other embodiments of the invention may use two solutions and more than three solutions, in similarly arranged containers. Instead of using separate couvettes, a single multi-compartmented container can be used.

The described embodiment is intended to lase at three wavelengths simultaneously. However the same multi-dye-solution container arrangement can be used with a diffracting means which produces lasing at only a single tunable wavelength in the waveband covered by the same solutions. Such diffracting means may be a different type of grating or a prism-and-mirror combination, for example.

Also, although when the invention is required for eg experimental applications the diffracting means may be adjustable as shown, in other applications, eg of an "on-line" nature, this facility may not be necessary and the diffracting means may be fixed.

The pumping laser in the described embodiment is an XeCl excimer laser. However, other types of excimer laser can be used, and non-excimer lasers such as a copper vapour laser; indeed any sufficiently powerful laser meeting the wavelength criterion stated earlier can be used.

The cavity configuration described provides a short, compact, robust unit having a plurality of short, efficient, tuned cavities. This enables the emission of each dye to be tuned well into the wings of its emission spectrum. The small size and relating broad aspect ratio ($\sim 5:1$) of the individual gain filaments make the positioning and alignment of the cuvettes non-critical. The present laser forms an oscillator well adapted to provide tuned outputs for amplification in subsequent stages, for example.

We claim:

1. A dye laser comprising a cavity including container means for containing a plurality of separate dye solutions located between a semi-transparent reflector and a retroreflective diffracting means;

said container means having a compartment for each dye solution and said compartments having transparent portions extending transversely relative to a line between said reflector and said diffracting means, said portions being staggered in said transverse direction;

and pumping laser means arranged to simultaneously irradiate all said portions with a shallow beam directed in a transverse direction;

whereby when said compartments contain separate dye solutions whereof the emission spectra increase in wavelength from compartment to compartment starting from that compartment whose said transparent portion is nearest the pumping laser, each said portion intercepted by the beam can provide dye-laser action corresponding to its contained dye solution without absorption of its emitted spectrum by a solution whose emission spectrum is of longer wavelength.

2. A laser as claimed in claim 1 wherein the compartments are individual separable containers arranged in side-by-side overlapping relationship.

3. A laser as claimed in claim 1 wherein the transparent portions of said compartments are of rectangular cross-section.

4. A laser as claimed in claim 1 wherein the compartments are inclined in the direction of said line between said reflector and said diffracting means to suppress unwanted radiation reflected from their walls.

5. A laser as claimed in claim 1 wherein the diffracting means is one adapted to give retroreflection simultaneously at the same incidence angle in a plurality of diffraction orders whereby to produce simultaneous dye-laser action in all said compartments when containing appropriate dye solutions.

6. A laser as claimed in claim 5 wherein the diffracting means is an adjustably tilted grating.

7. A laser as claimed in claim 1 and including said separate dye solutions contained within the respective compartments of said container means.

8. A laser as claimed in claim 2 wherein the transparent portions of said compartments are of rectangular cross-section.

9. A laser as claimed in claim 2 wherein the compartments are inclined in the direction of said line between said reflector and said diffracting means to suppress unwanted radiation reflected from their walls.

10. A laser as claimed in claim 3 wherein the compartments are inclined in the direction of said line between said reflector and said diffracting means to suppress unwanted radiation reflected from their walls.

11. A laser as claimed in claim 8 wherein the compartments are inclined in the direction of said line between said reflector and said diffracting means to suppress unwanted radiation reflected from their walls.

12. A laser as claimed in claim 2 wherein the diffracting means is one adapted to give retroreflection simultaneously at the same incidence angle in a plurality of diffraction orders whereby to produce simultaneous dye-laser action in all said compartments when containing appropriate dye solutions.

13. A laser as claimed in claim 3 wherein the diffracting means is one adapted to give retroreflection simultaneously at the same incidence angle in a plurality of diffraction orders whereby to produce simultaneous dye-laser action in all said compartments when containing appropriate dye solutions.

14. A laser as claimed in claim 4 wherein the diffracting means is one adapted to give retroreflection simultaneously at the same incidence angle in a plurality of diffraction orders whereby to produce simultaneous dye-laser action in all said compartments when containing appropriate dye solutions.

15. A laser as claimed in claim 2 and including said separate dye solutions contained within the respective compartments of said container means.

16. A laser as claimed in claim 3 and including said separate dye solutions contained wherein the respective compartments of said container means.

17. A laser as claimed in claim 4 and including said separate dye solutions contained within the respective compartments of said container means.

18. A laser as claimed in claim 5 and including said separate dye solutions contained within the respective compartments of said container means.

19. A laser as claimed in claim 6 and including said separate dye solutions contained within the respective compartments of said container means.

* * * * *